United States Patent
Kang et al.

(10) Patent No.: US 9,088,947 B2
(45) Date of Patent: Jul. 21, 2015

(54) METHOD FOR A TERMINAL TO TRANSMIT DATA IN A WIRELESS COMMUNICATION SYSTEM, AND A DEVICE THEREFOR

(75) Inventors: Seunghyun Kang, Gyeonggi-do (KR); Dongguk Lim, Gyeonggi-do (KR); Hangyu Cho, Gyeonggi-do (KR); Kyujin Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 13/885,222

(22) PCT Filed: Nov. 15, 2011

(86) PCT No.: PCT/KR2011/008695
§ 371 (c)(1),
(2), (4) Date: May 14, 2013

(87) PCT Pub. No.: WO2012/067400
PCT Pub. Date: May 24, 2012

(65) Prior Publication Data
US 2013/0235779 A1   Sep. 12, 2013

Related U.S. Application Data

(60) Provisional application No. 61/413,485, filed on Nov. 15, 2010.

(51) Int. Cl.
*H04W 52/02* (2009.01)
*H04L 1/16* (2006.01)
*H04L 1/18* (2006.01)

(52) U.S. Cl.
CPC ......... *H04W 52/0225* (2013.01); *H04L 1/1854* (2013.01); *H04L 1/1887* (2013.01); *H04W 52/0216* (2013.01); *H04L 1/1671* (2013.01); *H04L 1/1812* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,265,080 B2* | 9/2012 | Cai et al. | 370/395.2 |
| 2005/0119008 A1 | 6/2005 | Haumont | |
| 2008/0130492 A1* | 6/2008 | Kuo | 370/226 |
| 2008/0310338 A1* | 12/2008 | Charpenter et al. | 370/315 |
| 2009/0054006 A1* | 2/2009 | Cai et al. | 455/73 |
| 2009/0073907 A1* | 3/2009 | Cai | 370/311 |
| 2009/0247214 A1* | 10/2009 | Cai et al. | 455/550.1 |
| 2010/0057485 A1 | 3/2010 | Luft | |

OTHER PUBLICATIONS

3GPP TS 22.368 V10.2.0 'Service requirements for Machine-Type Communications (MTC)' Stage 1(Release 10) Oct. 1, 2010.
International Search Report issued in corresponding International Patent Application No. PCT/KR2011/008695 dated Jul. 30, 2012.
Written Opinion and International Search Report issued in corresponding International Patent Application No. PCT/KR2011/008695 dated Jul. 30, 2012.

* cited by examiner

*Primary Examiner* — Huy D Vu
*Assistant Examiner* — Hong Shao
(74) *Attorney, Agent, or Firm* — Morgan, Lewis & Bockius LLP (57) ABSTRACT

The present application discloses a method for a terminal to transmit a signal in a wireless communication system. In more detail, the method includes transmitting uplink data to a base station at a data transmission period. The data transmission period includes at least one power-reduction period divided into an activation period and a deactivation period, wherein the uplink data are transmitted to the base station in the activation period.

6 Claims, 9 Drawing Sheets

(a) CONTROL-PLANE PROTOCOL STACK (b) USER-PLANE PROTOCOL STACK

METHOD FOR A TERMINAL TO TRANSMIT DATA IN A WIRELESS COMMUNICATION SYSTEM, AND A DEVICE THEREFOR

TECHNICAL FIELD

The present invention relates to a wireless communication system, and more particularly, to a method of transmitting data from a user equipment in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

Figure 1:
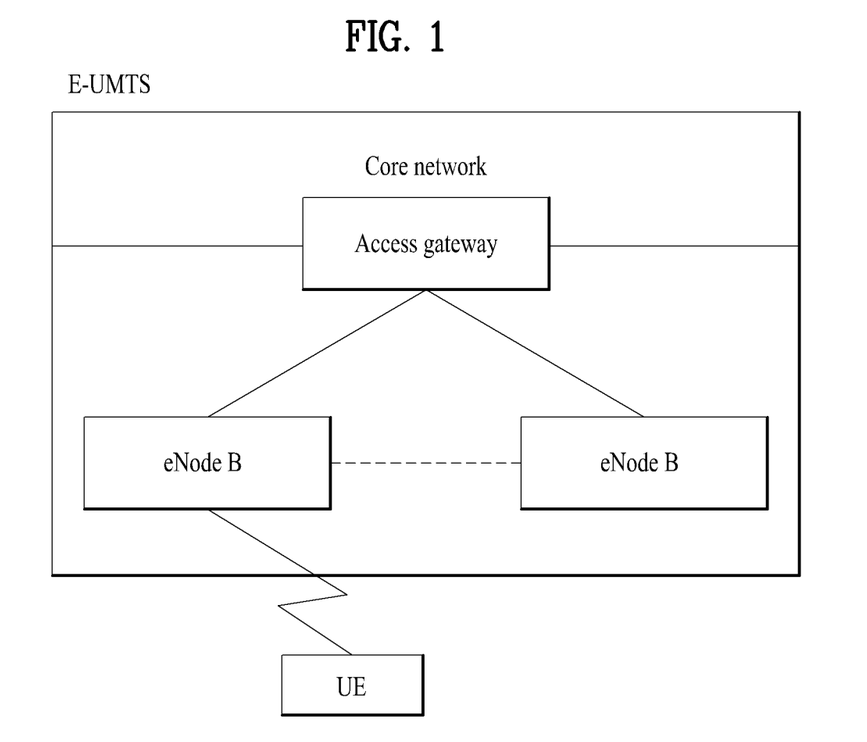
FIG. 1 is a schematic diagram of E-UMTS network structure as an example of a mobile communication system.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of transmitting data from a user equipment in a wireless communication system and apparatus therefor shall be proposed in the following description.

Technical Solution

To achieve these and other advantages and in accordance with the purpose of the present invention, as embodied and broadly described, a method of transmitting a signal, which is transmitted by a user equipment in a wireless communication system, according to the present invention includes the step of transmitting uplink data to a base station in each data transmission period, wherein the each data transmission period comprises at least one power reduced period divided into an active interval and an inactive interval and wherein the uplink data is transmitted to the base station in the active interval. Preferably, the power reduced period is defined as a preset number of frames.

Preferably, the uplink data is transmitted to the base station in the active interval of a $1^{st}$ one of the at least one power reduced period. More preferably, the method further includes the step of transceiving a control information with the base station in the active interval of a different one of the at least one power reduced period except the $1^{st}$ power reduced period.

According to one embodiment, the active interval of the $1^{st}$ one the at least one power reduced period is defined based on a maximum count of an HARQ (hybrid automatic repeat and request) process. And, the HARQ process is performed only in the active interval of the $1^{st}$ one of the at least one power reduced period.

According to another embodiment, the active interval and the inactive interval are constant in the data transmission period. An HARQ (hybrid automatic repeat and request) process for the uplink data is performed across all active intervals of the at least one power reduced period configuring the data transmission period. And, an HARQ feedback for the uplink data may be included in the control information received from the base station in each of the all active intervals.

In the above embodiments, the method may further include the step of if re-connected to the base station in an uncompleted state of the HARQ process, transmitting a connection identifier between the base station and the user equipment to the base station.

To further achieve these and other advantages and in accordance with the purpose of the present invention, as embodied and broadly described, a method of transmitting a signal, which is transmitted by a base station in a wireless communication system, according the present invention includes the step of transmitting downlink data to a user equipment in each data transmission period, wherein the each data transmission period comprises at least one power reduced period divided into an active interval and an inactive interval and wherein the downlink data is transmitted to the user equipment in the active interval.

Advantageous Effects

According to an embodiment of the present invention, a user equipment in a wireless communication system can effectively reduce power consumption.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 2:
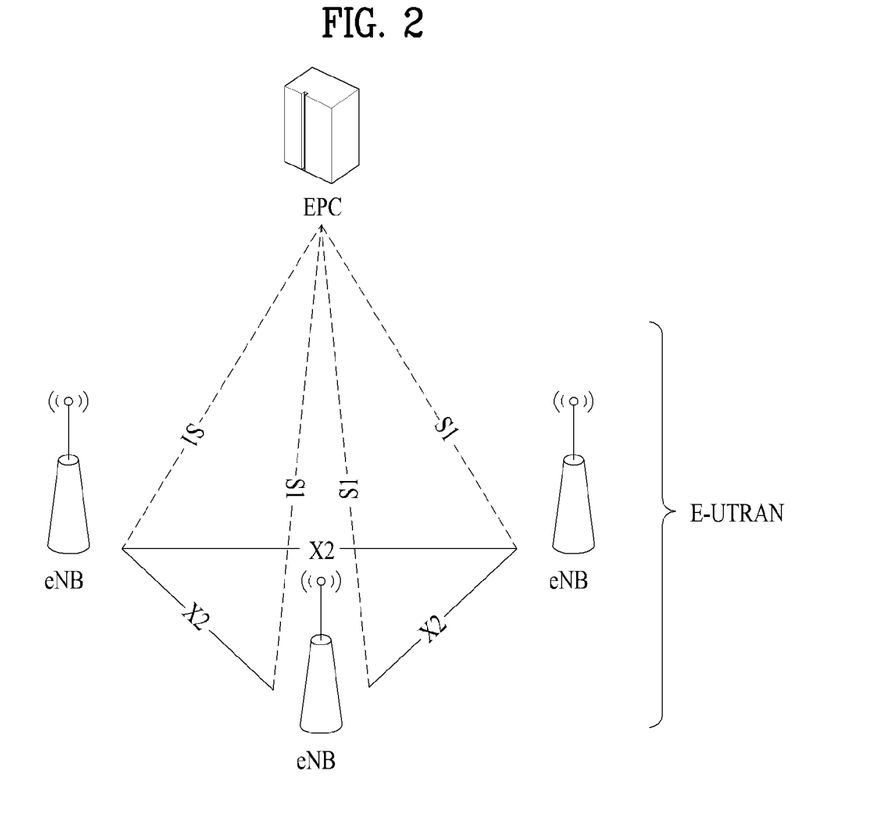
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
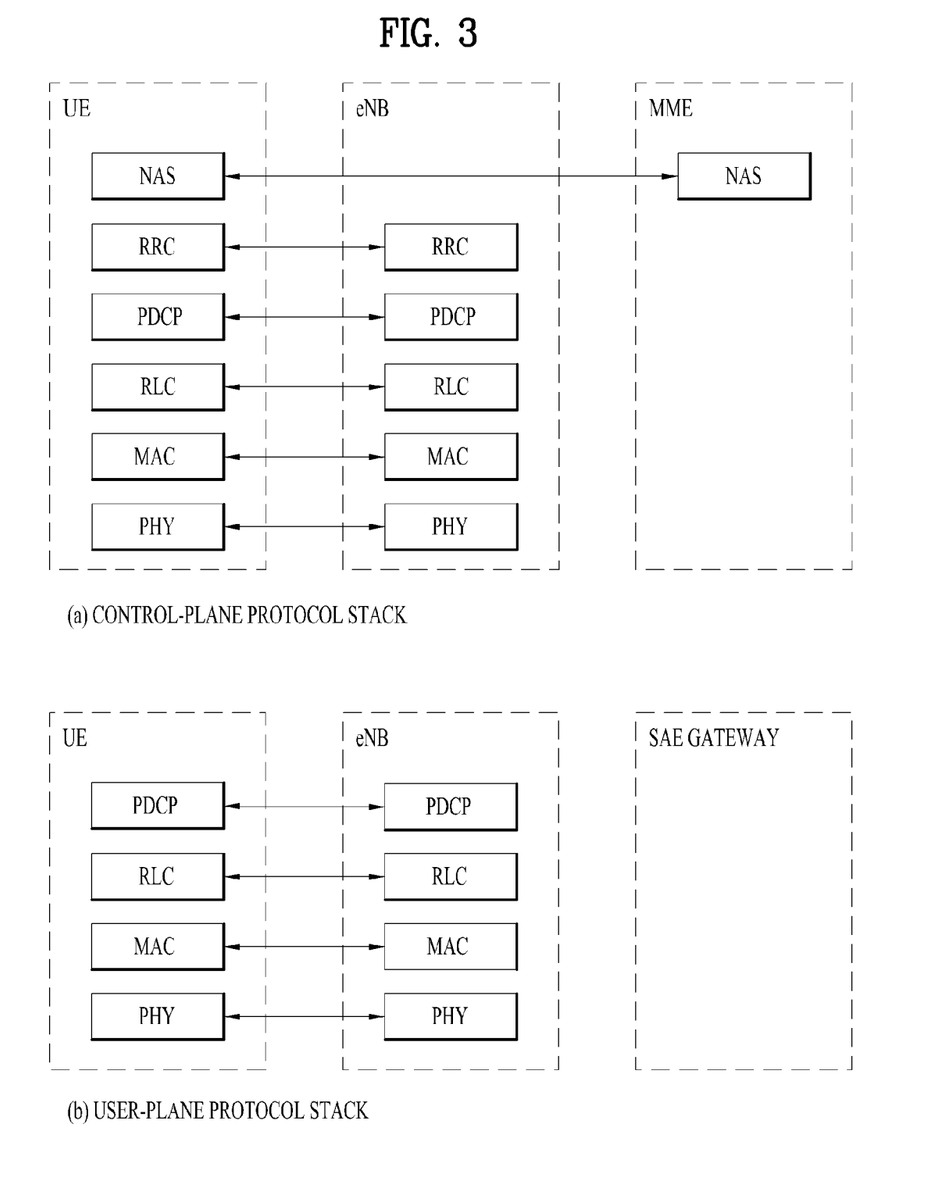
FIG. 3 is a diagram of structures of control and user planes of a radio interface protocol between a user equipment and E-UTRAN based on 3GPP radio access network specification.

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network.

In the following description, an RRC state of a user equipment and a corresponding RRC connecting method are explained. In this case, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Particularly, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it means the case that an uplink data transmission is necessary due to user's call attempt or the like or the case that a response message needs to be sent in case of receiving a paging message from the E-UTRAN.

NAS (non-access stratum) layer situated above RRC layer performs such a function as a session management and a mobility management and the like. In the NAS layer, in order to manage mobility of a user equipment, two kinds of states EMM-REGISTERED (EPS mobility Management-REGISTERED) and EMM-DEREGISTERED. These two states may apply to a user equipment and an MME. A user equipment in an early stage is in EMM-DEREGISTERED state. In order to access a network, this user equipment performs a process for registering with the corresponding network via an initial attach procedure. If the attach procedure is successfully completed, each of the user equipment and the MME enters EMM-REGISTERED states.

In order to manage a signaling connection between a user equipment and an EPC, two kinds of states ECM-IDLE (EPS connection management) and ECM-CONNECTED are defined in the NAS layer. These two states may apply to a user equipment and an MME. If a user equipment in ECM-IDLE state establishes an RRC connection with E-UTRAN, the corresponding user equipment is in ECM-CONNECTED state. If MME in ECM-ILDE establishes S1 connection with E-UTRAN, the corresponding MME enters ECM-CONNECTED state.

When a user equipment is in ECM-IDLE state, E-UTRAN may not have information (context) of the user equipment. Hence, the user equipment in ECM-IDLE state may perform a UE based mobility related procedure such as a cell selection and a cell reselection without receiving a command from a network. On the contrary, when a user equipment in ECM-CONNECTED state, mobility of the user equipment is managed by a command given by a network. If a location of a user equipment in ECM-IDLE state deviates from a location known to a network, the user equipment informs the network of a corresponding location of the user equipment through a tracking area update procedure.

In LTE system, a single cell constructing a base station (eNB) is configured to have one of bandwidths including 1.25 MHz, 2.5 MHz, 5 MHz, 10 MHz, 15 MHz, 20 MHz and the like and provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
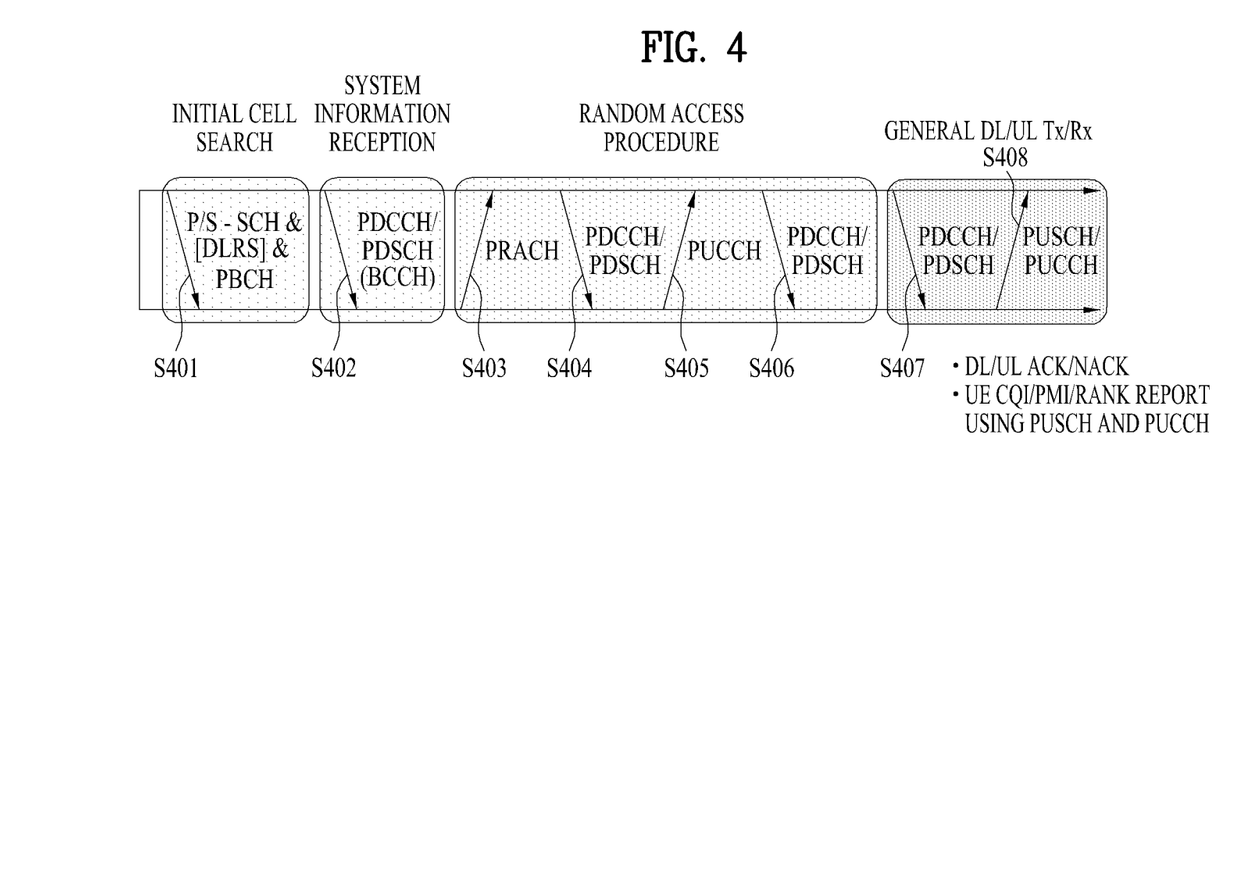
FIG. 4 is a diagram for explaining physical channels used for 3GPP system and a general method of transmitting a signal using the same.

FIG. 4 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S401]. To this end, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
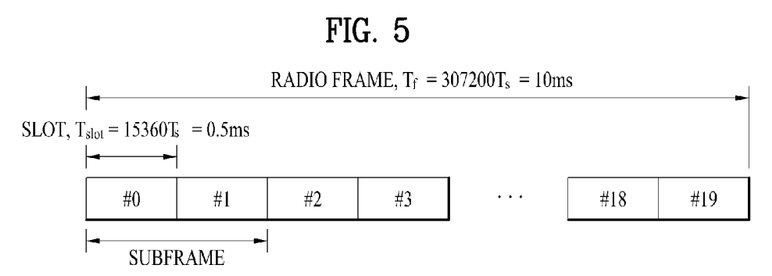
FIG. 5 is a diagram for an example of a structure of a radio frame used for LTE system.

FIG. 5 is a diagram for an example of a structure of a radio frame used by LTE system.

Referring to FIG. 5, a radio frame has a length of 10 ms ($327200 \times T_s$) and is constructed with 10 subframes in equal size. Each of the subframes has a length of 1ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 6:
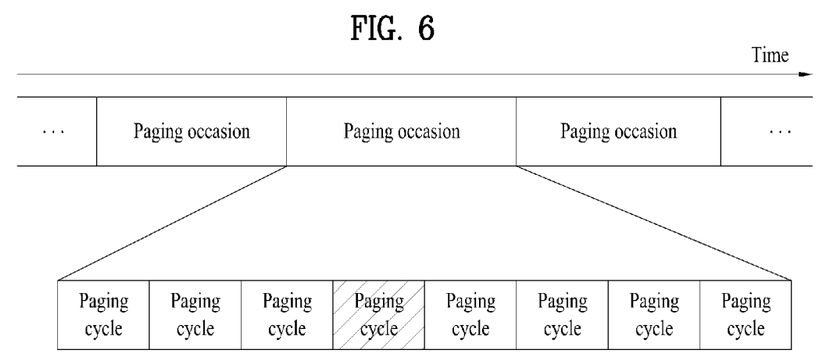
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In order to inform a user equipment whether system information has been changed, a base station sends a paging message. In this case, the paging message contains a system information change indicator. The user equipment receives the paging message by paging cycles. If the received paging message contains the system information change indicator, the user equipment receives system information transmitted on a logical channel BCCH.

In the following description, MTC (machine type communication) is explained.

First of all, MTC means that a communication is performed between a machine and machine without human interventions. And, a user equipment used for the MTC includes an MTC device. The MTC may be called M2M (machine to machine) in other words. A service provided via MTC is different from a conventional service in a human intervening communication. And, services belong to various categories exist as follows. For instance, the MTC can provide such a service as tracking, metering, payment, medical field service, remote control and the like.

Figure 7:
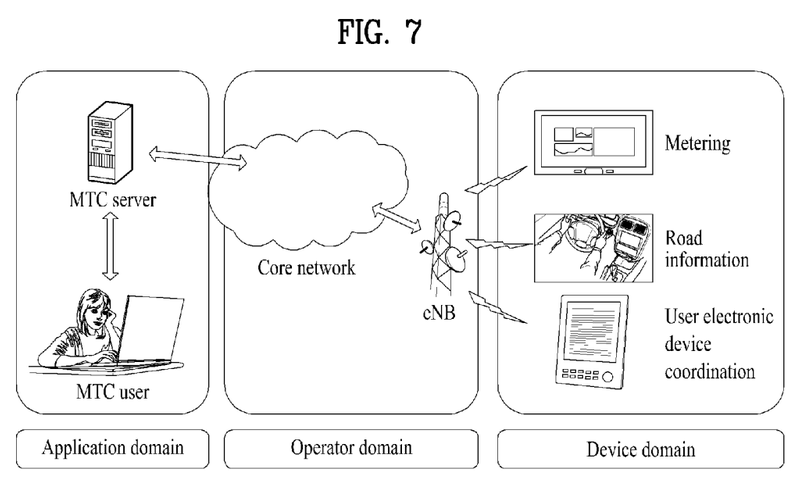
FIG. 7 is a diagram to describe a structure of MTC (machine type communication.

FIG. 7 is a diagram to describe a structure of MTC (machine type communication).

An MTC device communicates with another MTC device or an MTC server via a mobile communication network. Referring to FIG. 7, the MTC server can provide an MTC user with such a service provided through the MTC device as a metering (e.g., a smart grid, a smart metering, etc.), road information, user electronic device coordination and the like.

In order to efficiently support the MTC service, such a property of the MTC device as low mobility, time or delay tolerant, delay tolerance, small data transmission and the like can be taken into consideration. Due to this reason, the MTC device can be called a delay tolerant access supportive user equipment.

In MTC or M2M communication, a user equipment has data traffic property determined in accordance with an application to use and a data transmitting method is determined depending on the property of the data traffic. Moreover, such an application as metering (e.g., smart grid, smart metering, etc.) has a property in which a user equipment transmits data traffic in a determined time only with a considerably long-term cycle. And, a transmitting method according to this property is called a time controlled data transmission.

Hence, in the time controlled data transmission, it is preferable that a user equipment deactivates most of its functions to reduce power consumption during the rest of time of a transmission cycle except a time of transmitting the data traffic.

Meanwhile, if the user equipment stays in an inactive state too long in the course of the time controlled data transmission, it is unable to update various kinds of informations for maintaining a connection to a base station in a variable channel situation. To prevent this, proposed is a periodic power consumption reduction scheme in a transmission period of a time controlled data transmission.

Figure 8:
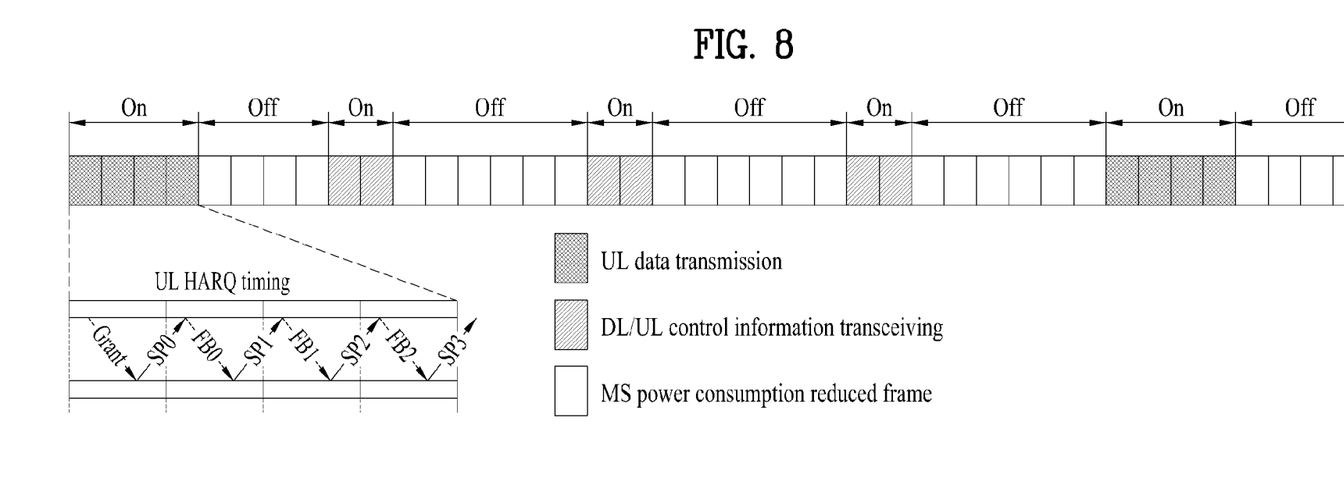
FIG. 8 is a diagram for one example of applying a periodic power consumption reduction scheme according to an embodiment of the present invention.

FIG. 8 is a diagram for one example of applying a periodic power consumption reduction scheme according to an embodiment of the present invention.

Referring to FIG. 8, assuming that 8 frames configure a single power consumption reduced period, 'On' is designated as an active interval of a user equipment and 'Off' is designated as an inactive interval of the user equipment. In this case, within the transmission period of the time controlled data transmission, a user equipment can receive various kinds of informations for maintaining a connection to a base station or transmit information to the base station during the active interval existing periodically.

Particularly, it can be observed from FIG. 8 that first 4 frames of a $1^{st}$ power consumption reduced period are set as an active interval. This indicates that HARQ initial transmission and retransmission are performed in a single power consumption reduced period. And, it shows that a user equipment can enter an inactive interval only after completion of the HARQ initial transmission and retransmission. Moreover, it is able to design that DL/UL control information is transceived in an active interval of the rest of the power consumption reduced period.

Meanwhile, in the time controlled data transmission, as shown in FIG. 8, a user equipment has a considerably long-term data transmission period, transmits a new data traffic in a determined time only, and has several power consumption reduced periods between data transmission periods. If so, it is possible to perform HARQ retransmission in an active interval of at least one power consumption reduced period as well as in a single power consumption reduced period.

In particular, an HARQ initial transmission is always performed in an active interval of a $1^{st}$ power consumption reduced period and an HARQ retransmission is performed in an active interval of the $1^{st}$ or next power consumption reduced period.

In this case, an HARQ feedback transmitted to a user equipment from a base station can be configured in a manner that an HARQ feedback IE (information element) is attached to a payload or header of a control information used to be transmitted in an active interval. Alternatively, it is able to consider that a control information for the HARQ feedback is separately defined or that an HARQ channel for the HARQ feedback is separately defined.

If a user equipment receives NACK in response to a previous HARQ transmission (or retransmission) or fails in receiving any HARQ feedbacks, the user equipment can retransmit HARQ subpacket in an active interval using the same resource (i.e., the same time resource and the same frequency resource, etc.) used for the previous HARQ transmission (or retransmission) unless a maximum HARQ retransmission count is exceeded. Moreover, a base station is able to transmit a new resource allocation information for an HARQ retransmission together with an HARQ feedback in an active interval, while a user equipment is able to retransmit HARQ subpacket using a newly allocated resource. This is described in detail with reference to the accompanying drawings.

Figure 9:
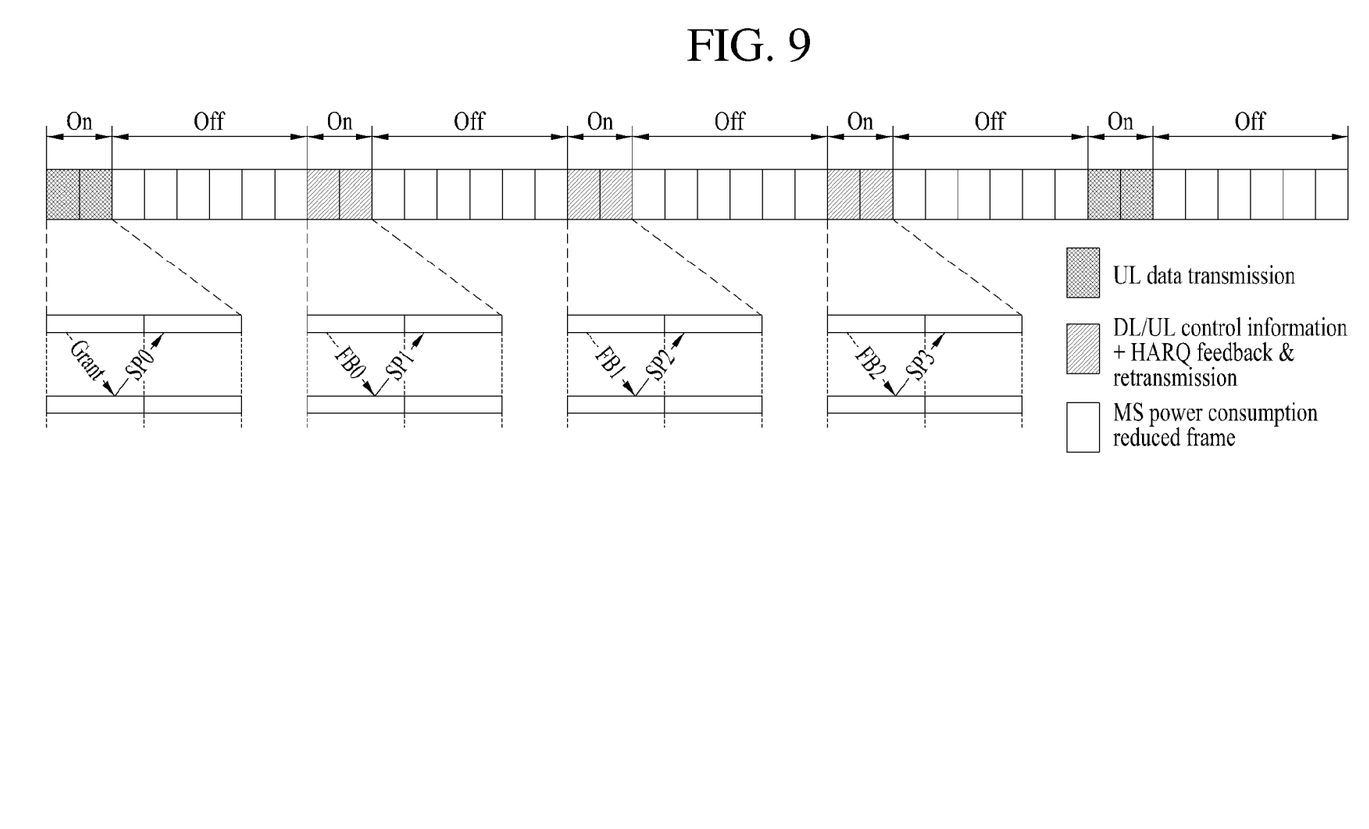
FIG. 9 is a diagram for one example of an HARQ transmitting method according to an embodiment of the present invention.

FIG. 9 is a diagram for one example of an HARQ transmitting method according to an embodiment of the present invention.

Referring to FIG. 9, in an active interval, it can be observed that a user equipment receives a UL grant or an HARQ feedback in response to a previous HARQ transmission and performs an HARQ retransmission.

Figure 10:
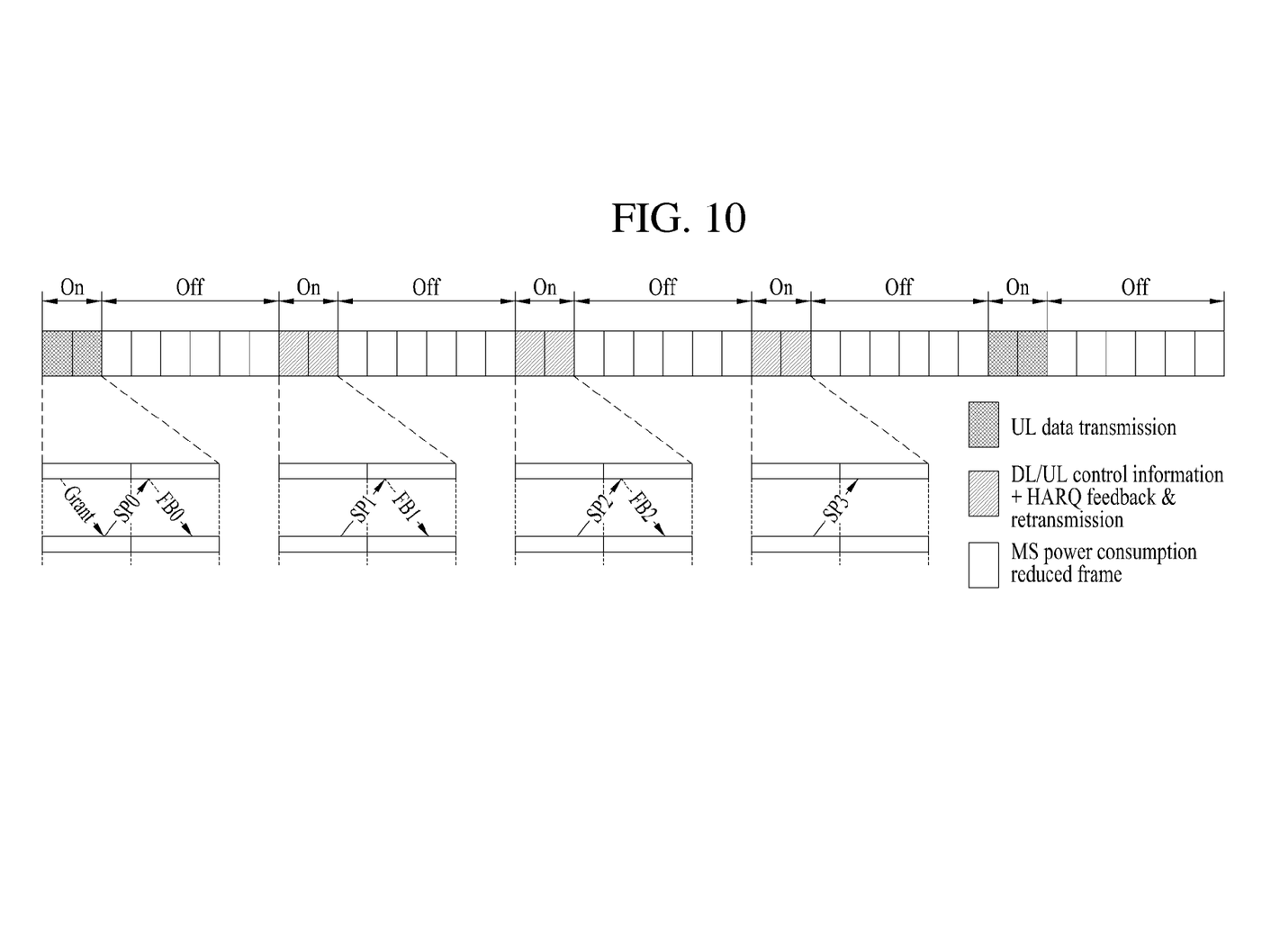
FIG. 10 is a diagram for another example of an HARQ transmitting method according to an embodiment of the present invention.

FIG. 10 is a diagram for another example of an HARQ transmitting method according to an embodiment of the present invention.

Referring to FIG. 10, in an active interval of a $1^{st}$ power consumption reduced period, a user equipment performs an HARQ initial transmission by receiving a UL grant. In the same active interval, the user equipment receives an HARQ feedback in response to an initial transmission. In an active interval of the rest of the power consumption reduced period, the user equipment performs an HARQ retransmission in response to an HARQ feedback received in a previous power consumption reduced period.

Since HARQ retransmission is performed only in an active interval of a power consumption reduced period in a time controlled data transmission, as shown in FIG. 9 or FIG. 10, an active interval, in which a user equipment operates, decreases further than that shown in FIG. 8, whereby a power consumption can be considerably reduced. Moreover, since a constant active interval is always provided in one power consumption reduced period, a design of periodic power consumption reduction is facilitated. So to speak, it is able to design a uniform time, in which a user equipment is active, in one power consumption reduced period.

Meanwhile, in a periodic power consumption reducing process, a user equipment can perform a re-entry procedure on a base station. In doing so, the user equipment can receive an assignment of a new connection identifier (ID) for a connection between the user equipment and the base station. Yet, if an HARQ transmission (or retransmission) of the user equipment is not completed yet, the base station can be designed in a following manner.

First of all, it is preferable that the base station tracks the connection ID of the user equipment until the HARQ process is finished. In particular, if the tracked user equipment performs a re-entry, the user equipment can inform the base station of a connection ID previously retained by the user equipment.

In this case, if the HARQ process is not completed, the base station reassigns the previous connection ID. Moreover, if the HARQ process is not completed, the base station does not assign the connection ID of the user equipment to another user equipment.

Figure 11:
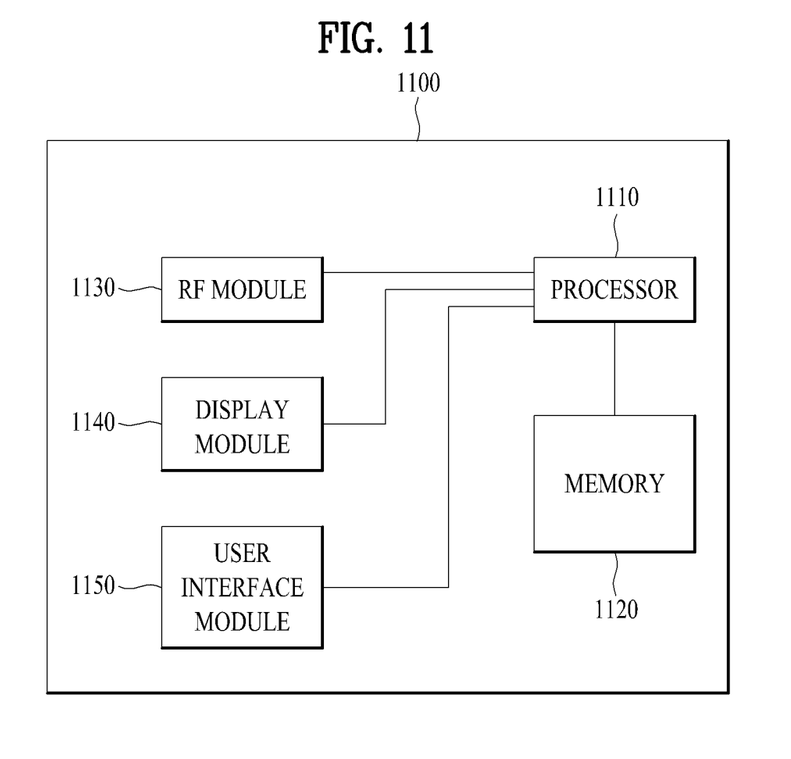
FIG. 11 is a block diagram for one example of a communication device according to one embodiment of the present invention.

FIG. 11 is a block diagram for one example of a communication device according to one embodiment of the present invention.

Referring to FIG. 11, a communication device 1100 includes a processor 1110, a memory 1120, an RF module 1130, a display module 1140 and a user interface module 1150.

The communication device 1100 is illustrated for clarity and convenience of the description and some modules can be omitted. Moreover, the communication device 1100 is able to further include at least one necessary module. And, some modules of the communication device 1100 can be further divided into sub-modules. The processor 1110 is configured to perform operations according to the embodiment of the present invention exemplarily described with reference to the accompanying drawings. In particular, the detailed operations of the processor 1110 can refer to the contents described with reference to FIGS. 1 to 10.

The memory 1120 is connected to the processor 1110 and stores an operating system, applications, program codes, data and the like. The RF module 1130 is connected to the processor 1110 and performs a function of converting a baseband signal to a radio signal or converting a radio signal to a baseband signal. For this, the RF module 1130 performs analog conversion, amplification, filtering and frequency uplink transform or inverse processes thereof. The display module 1140 is connected to the processor 1110 and displays various kinds of informations. The display module 1140 can include such a well-known element as LCD (Liquid Crystal Display), LED (Light Emitting Diode), OLED (Organic Light Emitting Diode) and the like, by which the present invention is non-limited. The user interface module 1150 is connected to the processor 1110 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that those claims can be included as new claims by revision after filing an application.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of transmitting a signal by a user equipment in a wireless communication system, the method comprising:
   receiving an uplink grant for uplink data from a base station in each data transmission period; and
   transmitting the uplink data based on the uplink grant to the base station in the each data transmission period,
   wherein the each data transmission period comprises a plurality of power reduced periods,
   wherein each of the plurality of power reduced periods is divided into an active interval and an inactive interval,
   wherein a reception of the uplink grant and a transmission of the uplink data only are performed in the active interval of a first one of the plurality of power reduced periods within the each data transmission period, and
   wherein control information for maintaining a connection with the base station is transmitted to the base station in the active interval of the plurality of power reduced periods, except the first power reduced period within the each data transmission period.

2. The method of claim 1, wherein the power reduced period is defined as a predetermined number of frames.

3. The method of claim 1, wherein a size of the active interval of the first one of the plurality of power reduced periods is defined based on a maximum count of an HARQ (hybrid automatic repeat and request) process.

4. The method of claim 3, wherein the HARQ process is performed only in the active interval of the first one of the plurality of power reduced periods.

5. The method of claim 4, further comprising, if re-connected to the base station in an uncompleted state of the HARQ process, transmitting a connection identifier between the base station and the user equipment to the base station.

6. A method of transmitting a signal by a base station in a wireless communication system, the method comprising:
   receiving a downlink assignment for downlink data to a user equipment in each data transmission period; and
   transmitting the downlink data based on the downlink assignment to the user equipment in the each data transmission period,
   wherein the each data transmission period comprises a plurality of power reduced periods,
   wherein each of the plurality of power reduced periods is divided into an active interval and an inactive interval,
   wherein transmissions of the downlink assignment and the downlink data only are performed in the active interval of a first one of the plurality of power reduced periods within the each data transmission period, and
   wherein control information for maintaining a connection with the user equipment is transmitted to the user equipment in the active interval of the plurality of power reduced periods, except the first power reduced period within the each data transmission period.

* * * * *